United States Patent [19]

Shea

[11] 3,754,310

[45] Aug. 28, 1973

[54] METHOD OF MAKING AN ELECTRICAL ASSEMBLY FASTENED WITH THERMOPLASTIC EYELET

[75] Inventor: Gerald J. Shea, Buffalo Grove, Ill.

[73] Assignee: Underwriters Safety Device Co., Chicago, Ill.

[22] Filed: July 29, 1971

[21] Appl. No.: 167,234

[52] U.S. Cl. ............ 29/25.42, 24/73 P, 24/90 HA, 24/142, 29/512, 29/609, 264/249, 317/261
[51] Int. Cl............................................. H01g 13/00
[58] Field of Search................. 24/90 H, 90 A, 141, 24/142, 73 P, 202; 29/25.42, 609, 512; 264/249; 317/261

[56] References Cited
UNITED STATES PATENTS

| | | | |
|---|---|---|---|
| 271,035 | 1/1883 | Carpenter | 24/142 |
| 1,122,280 | 12/1914 | Kempshall | 24/142 UX |
| 2,343,983 | 3/1944 | Knowlton | 24/141 UX |
| 3,462,803 | 8/1969 | Horton | 24/90 HA UX |
| 2,637,771 | 5/1953 | Tumulo | 29/576 J UX |
| 2,748,047 | 5/1956 | Kuss | 24/142 X |
| 2,209,546 | 7/1940 | Flanzer | 29/25.42 X |
| 1,881,130 | 10/1932 | Procter | 29/25.42 X |

*Primary Examiner*—Charles W. Lanham
*Assistant Examiner*—Carl E. Hall
*Attorney*—Fred S. Lockwood, Joseph P. O'Halloran et al.

[57] ABSTRACT

The assembly includes at least two pieces of material, each having a hole therein aligned with the hole in the other piece of material, and a plastic eyelet positioned in the holes and having a radially extending flange on one end thereof which engages one piece of material and a rolled over rim at the other end thereof which engages the other piece of material to hold the pieces of material together. The method includes the steps of: assembling the pieces of material with a plastic sleeve positioned in the holes, the sleeve having the radially extending flange on one end with the other end of the sleeve extending beyond one piece of material; holding the flange against one piece of material while raising the temperature of the extending end of the sleeve above its softening temperature; and simultaneously shaping at least a part of the extending end of the sleeve into the rolled over rim which extends radially from the extending end of the sleeve and in abutment with the other piece of material.

5 Claims, 5 Drawing Figures

Patented Aug. 28, 1973
3,754,310
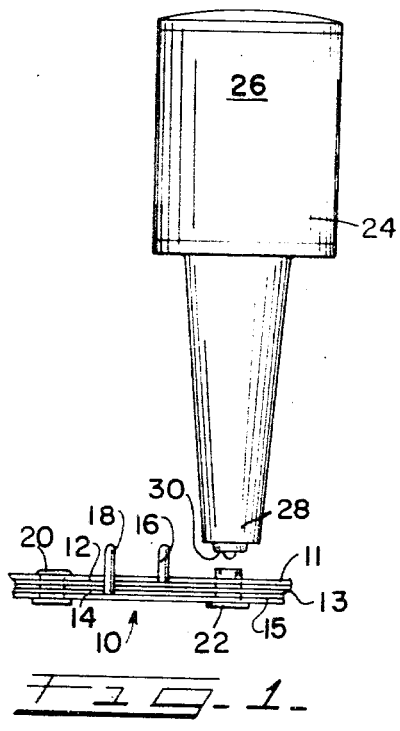
FIG. 1.
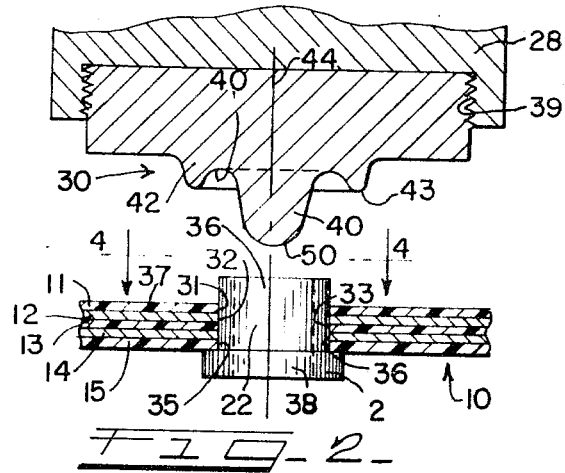
FIG. 2.
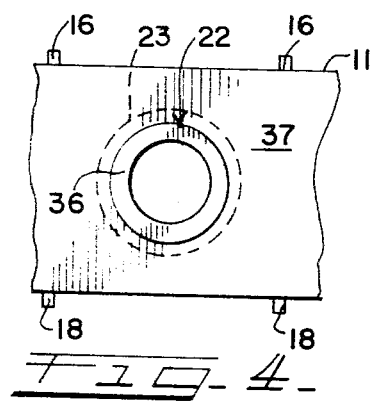
FIG. 4.
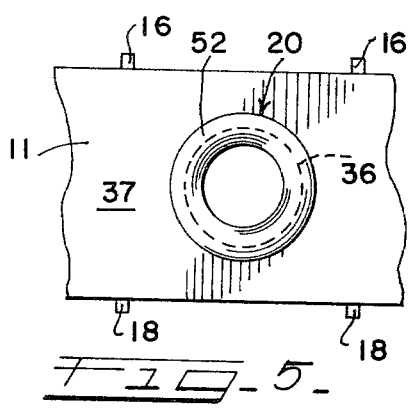
FIG. 3.
FIG. 5.
INVENTOR
GERALD J. SHEA
BY
ATT'Y

METHOD OF MAKING AN ELECTRICAL ASSEMBLY FASTENED WITH THERMOPLASTIC EYELET

The present invention relates to an improved assembly, and particularly to an electrical assembly, which is held together by a plastic eyelet. The invention also relates to a method for rolling over the end of a thermoplastic sleeve extending through at least two pieces of material to form the sleeve into an eyelet for holding the pieces of material together.

Heretofore, metal eyelets have been widely used for fastening pieces of material together. Also in the recent past plastic rivets have been used in assemblies for holding at least two pieces of material together. In this use of a plastic rivet one end of the rivet is heated and staked over to hold two or more pieces together. Typically, an ultrasonic welding device is utilized for staking over the end of the rivet.

The utilization of a plastic eyelet in place of a metal eyelet or a metal or plastic rivet has not been considered feasible since plastic materials do not have the requisite ductility to permit rolling over of the end of the sleeve to form the eyelet. In this respect, either the elasticity of the plastic material or the brittleness of the material would prevent adequate rolling over of the end of a plastic sleeve to form a plastic eyelet. In other words, for a soft plastic material the rolled over portion of the sleeve would not retain the rolled over state because of the "memory" of the material and the rolled over portion would bend back toward, if not completely to, its original position. If the plastic material is brittle the rolled over portion would crack and would not form a suitable annular collar for holding at least two pieces of material together.

If heat is used, one problem that is incurred is the inability to localize the heat at the end of the sleeve so that only the end of the sleeve is softened. Another problem is the proper forming or shaping of the softened end into a collar or rim extending radially outwardly from the central axis of the sleeve to form the eyelet. In view of these problems, the use of plastic eyelets has not appeared to be practical or feasible.

Nonetheless, the use of a plastic eyelet in place of a metal eyelet has a number of advantages. First of all, a plastic eyelet is usually formed from much less material than a plastic or metal rivet and therefore a saving of the plastic material is obtained. Secondly, in an electrical assembly where at least two pieces of insulating material are brought together with a piece of electrically conductive material interposed therebetween and fastened together, it is desirable that no electrical contact (short circuit) be made between the electrically conductive material and the fastening means such as an eyelet or rivet utilized for fastening the pieces of material together.

In the past, to minimize and hopefully to prevent such short circuits the hole in the conductive material was made larger than the holes in the insulating material so that when the holes are coaxially aligned, the fastener extending between and secured in the holes of the insulating material will not engage the larger circumference of the hole in the conductive material. However, in many instances the conductive material can be moved relative to the pieces of insulating material so that a portion thereof contacts the fastener and if the fastener is a metal eyelet the metal eyelet is raised to the potential of the electrically conductive material. This can cause serious problems where a mounting screw extends through the metal eyelet and is fastened to a metal base or wall in an electrical cabinet particularly where the base or wall is at ground potential. Thus, when the electrically conductive materials is shifted relative to the pieces of insulating material, the piece of conductive material may come in contact with the metal eyelet and cause a short circuit.

Accordingly, in one preferred embodiment of the assembly of the present invention at least two pieces of material, each with a hole therein aligned with the hole in the other piece of material, are held together by a thermoplastic eyelet received through the aligned holes. The plastic eyelet is formed from a sleeve which has a projection extending radially outwardly from one end of the sleeve. When the sleeve is inserted into the aligned holes the projection abuts against one of the pieces of material and the other end of the sleeve extends outwardly from the other piece of material. The extending end of the plastic sleeve is rolled over to form the plastic eyelet and hold the two pieces of material together.

The method of the present invention for forming the above described assembly includes the steps of bringing the two pieces of material together with the holes therein aligned, inserting the thermoplastic sleeve into the aligned holes with the projection engaging one piece of material and the other end of the sleeve extending outwardly from the second piece of material, holding the projection against the one piece of material while raising the temperature of the extending end of the sleeve above the softening temperature, and simultaneously shaping at least a part of the extending end of the sleeve into a projection extending radially from the sleeve and in abutment with the other piece of material.

From the foregoing description it is apparent that a number of advantages can be obtained by fastening two or more pieces of material together with a plastic eyelet. Accordingly, a primary object of the present invention is to provide an assembly which includes two pieces of material fastened together with a non-metallic eyelet.

It is another object of the present invention to provide the assembly described in the preceding paragraph and in which the non-metallic eyelet is thermoplastic.

Another object of the present invention is to provide a method for forming the assembly described in the preceding paragraph wherein the method includes the steps of raising the temperature of a projecting end of a thermoplastic sleeve above its softening temperature while simultaneously shaping at least a part of the projecting end of the sleeve into a projection extending radially from the sleeve.

Another object of the present invention is to provide a method as described in the preceding paragraph wherein the step of raising the temperature of the projecting end of the sleeve is accomplished by bringing the tip of a shaping tool into contact with the projecting end of the sleeve while vibrating the tip.

Another object of the present invention is to provide a method of the type defined in the preceding paragraph wherein the tip of the shaping tool has an annular groove therein which is adapted to come into contact with the extending end of the sleeve.

Another object of the present invention is to provide a method of the type defined in the preceding paragraph wherein the outer edge of the annular groove is defined by an annular ring which engages one of the pieces of material when the tool is brought into contact with the projecting end of the sleeve to prevent flash when the temperature of the projecting end of the sleeve is raised to its softening point.

Another object of the present invention is to provide a method of the type described in the preceding paragraph wherein the shaping tool has a central axis, the groove is concentric with the axis and the tip of the tool includes a central projection located on the central axis.

Still another object of the present invention is to provide an electrical assembly comprising at least two pieces of insulating material and at least one piece of electrically conductive material which is interposed between the two pieces of insulating material and in which assembly the pieces of material are held together by a plastic eyelet.

For a more complete understanding of the nature and scope of the present invention reference may now be had to the accompanying drawings wherein:

FIG. 1 is an elevational view of a portion of an electrical assembly as it is being fastened together by plastic eyelets and an ultrasonic assembly in position to form a plastic sleeve into a plastic eyelet;

FIG. 2 is an enlarged fragmentary view, partially in section, of the sleeve shown in FIG. 1 and the tip of the ultrasonic assembly;

FIG. 3 is a view similar to FIG. 2 showing the position of the tip of the ultrasonic assembly when it is brought into contact with the extending end of the sleeve;

FIG. 4 is a top plan view of the sleeve and assembly shown in FIG. 2 and taken along line 4—4 of FIG. 2; and FIG. 5 is a top plan view similar to FIG. 4 and showing the sleeve after it has been rolled over, and is taken along line 5—5 of FIG. 3.

Referring now to the drawings in greater detail, a laminated electrical assembly is generally indicated at 10 in FIG. 1 and includes five pieces or strips of material 11–15. The strips of material 11, 13 and 15 are made of an insulating material and the intermediate strips 12 and 14, interposed between the strips 11 and 13 and 13 and 15, respectively, are made of an electrically conductive material.

The assembly 10 also includes a plurality of connector tabs which extend from each of the strips of electrically conductive material 12 and 14 on either side of the laminated assembly 10. One of the connector tabs extending from the strip 12 is generally indicated at 16 in FIG. 1 and extends from the side of the laminate 10 hidden from view in FIG. 1, and one of the connector tabs which extends from the strip 14 is indicated at 18. End views of several of the connector tabs 16 and 18 are shown in FIGS. 4 and 5.

According to the teachings of the present invention the laminate 10 formed from the pieces of material 11–15 are held together by plastic eyelets, one of which is shown at 20 in FIG. 1. Each eyelet 20 is formed from a thermoplastic sleeve 22. In FIG. 1, one such sleeve 22 is shown in position beneath an ultrasonic assembly or welder 24. The ultrasonic assembly 24 is conventional and of known type having a body portion 26 and a welding horn 28. However, the tip 30 of the welding horn 28 has a novel configuration which enables the horn 28 to be utilized in "rolling over" one end of the plastic sleeve 22 to form the eyelet 20 as will be more fully described in connection with FIGS. 2-5.

As shown in FIG. 2 each of the strips 11–15 has a hole therein sized to receive the plastic sleeve 22. These holes are indicated respectively at 31–35. It will be understood that when the laminated electrical assembly 10 is formed, the strips 11–15 are brought together with the holes 31–35 aligned for receiving the sleeve 22.

The sleeve 22 is sized to fit in the aligned holes 31–35 and has a radially extending projection or annular collar 23 which extends from one end 38 of the sleeve 22. Also, the sleeve 22 has a length which is greater than the width of the laminate formed by the strips 31–35 so that the other or second end 36 of the sleeve 22 extends beyond the outer surface 37 of the strip 11. The shape of the end 36 of the sleeve 22 before it is "rolled over" is best shown in FIG. 4.

In the enlarged view of FIG. 2 it is apparent that tip 30 is threaded and is secured in a mating threaded recess 39 in horn 28. Hence, in the illustrated embodiment, tip 30 is replaceable, in keeping with generally accepted practice, and this permits worn tips 30 to be replaced inexpensively. More importantly, perhaps, this feature makes the present invention readily and inexpensively adaptable to existing equipment having the replaceable tip feature.

The novel tip 30 includes an annular groove 40 which is adapted to come into contact with the extending end 36 of the sleeve 22 for shaping and/or forming a portion of the extending end 36 into a rolled over, annular projection or collar thereby forming the sleeve 22 into the eyelet 20 as will be hereinafter more fully described. The groove 40 is rounded and partially circular in cross section. The outer edge of the groove 40 is defined by an annular ring 42 which in the preferred embodiment shown in FIGS. 2 and 3 has a rounded surface 43.

The groove 40 and the ring 42 are coaxial with the central axis 44 of the tip 30 and horn 28, and the inner edge of the groove 40 is defined by the side of a projection 48 which extends outwardly from the tip 30 of the horn 28 on the central axis 44 of the horn 28 and tip 30. Preferably and as shown in FIGS. 2 and 3 the projection 48 has a rounded end 50.

With reference to FIG. 3 of the drawings, the method of the present invention for fastening the pieces or strips of material 11–15 together with the thermoplastic eyelets 20 includes the steps of: bringing the pieces 11–15 together with the holes 31–35 aligned, inserting into the aligned holes 31–35 the thermoplastic sleeve 22 with the projection or collar 23 at the one end 34 of the sleeve 22 in abutment with the strip 15 and with the other end 36 of the sleeve 22 extending outwardly from the strip 11, holding the projection or collar 23 against the strip 15 while raising the temperature of the extending end 36 of the sleeve 22 above its softening temperature and simultaneously shaping at least a part of the extending end 36 of the sleeve 22 into a projection or annular collar 52 extending radially from the sleeve 22 and in abutment with the strip 11. Preferably, the steps of raising the temperature of the end 36 and shaping the end 36 are accomplished by bringing the tip 30 into engagement under pressure with the end 36 of the sleeve 22 while vibrating the tip 30 at a high frequency such as for example at about 20,000 cycles per second.

As best shown in FIG. 3 when the tip 30 is brought into engagement with the extending end 36 of the sleeve 22 the end 36 is received in and shaped by the annular groove 40 as the tip 30 is pressed downwardly until the annular ring 42 on the tip 30 engages the surface 37 on the strip 31. This engagement between the ring 42 and the surface 37 of the strip 11 prevents the formation of flash, that is to say, it prevents some of the softened thermoplastic material at the end 36 of the sleeve 22 from flashing radially outwardly from the sleeve 22.

As shown in FIG. 3 the projection 48 extends into the interior of the sleeve 22 and this projection is preferred in the disclosed configuration of the tip 30 for the purpose of preventing the softened end 36 of the thermoplastic sleeve 22 from collapsing inwardly of the sleeve when the end 36 is being heated and shaped by the vibrating tip to form the annular collar 52.

A top plan view of the rolled over annular collar 52 formed by rolling over a part of the end 36 of the sleeve 22 to form the eyelet 20 is best shown in FIG. 5. As shown in FIGS. 3 and 5, the projection 52 extends radially from the end 36 of the sleeve 22 and is in abutment with the surface 37 of the strip 11.

From the foregoing description of a preferred embodiment of the electrical assembly of the present invention and the method for forming same, it will be apparent that the teachings of the present invention can be utilized in other assemblies wherein it is desired to fasten at least two pieces of material together with a non-metallic eyelet. Accordingly, the scope of the present invention is only to be limited as necessitated by the accompanying claims.

I claim:

1. A method for making an electrical assembly including first, second and third pieces of insulating material with first and second pieces of electrically conductive material positioned between said first and second pieces of insulating material and said second and third pieces of insulating material, respectively, said pieces of electrically conductive material being provided with connector tabs by which electrical connections may be made thereto, each of said pieces of insulating material and conducting material having a circular hole therein each of said holes having substantially the same diameter, said method including the steps of: bringing the pieces of material together to form a laminate having alternate layers of insulating and conductive material with the holes in all said pieces of material aligned; inserting into said aligned holes an insulating thermoplastic sleeve having abutment means extending radially outwardly from one end of said sleeve for engaging said first piece of insulating material, said sleeve having substantially the diameter of the aligned holes, said sleeve having a length greater than the combined thickness of said pieces of material so that the other end of said sleeve extends outwardly from said third piece of insulating material when said abutment means engages said first piece of insulating material; holding said abutment means against said first piece of insulating material while raising the temperature of said extending end portion of said sleeve above its softening temperature; and simultaneously shaping at least a part of said extending end of said sleeve into a projection extending radially from said sleeve and in abutment with said third piece of insulating material, thereby fastening said pieces together with said electrically conductive pieces being insulated from each other and said connector tabs available for connection thereto.

2. The method of claim 1 wherein said assembly further includes at least one additional piece of insulating material and at least one additional piece of electrically conductive material, the number of additional pieces of insulating material being equal to the number of additional pieces of conductive material, with respective pieces of conducting material positioned between respective adjacent pieces of insulating material and said sleeve has a length greater than the combined thickness of the laminate formed by said pieces of insulating material and said pieces of conducting material so that said other end of said sleeve extends beyond one side of said laminate.

3. The method of claim 1 wherein the temperature of the extending end portion is raised and the simultaneous shaping thereof is accomplished by bringing a shaping element axially against said extending end portion of said sleeve, and vibrating said shaping element at ultrasonic frequency sufficient to heat and shape the extending end portion.

4. The method of claim 3 wherein said assembly further includes at least one additional piece of insulating material and at least one additional piece of electrically conductive material, the number of additional pieces of insulating material being equal to the number of additional pieces of conductive material, with respective pieces of conductive material positioned between respective adjacent pieces of insulating material and said sleeve has a length greater than the combined thickness of the laminate formed by said pieces of insulating material and said pieces of conductive material so that said other end of said sleeve extends beyond one side of said laminate.

5. The method of claim 3 wherein said ultrasonic frequency is about 20,000 cycles per second.

* * * * *